May 13, 1969

H. W. LYONS

3,443,271

RECIPROCATING FLUID MOTOR

Filed May 9, 1966

Henry W. Lyons
INVENTOR.

BY Clarence A. O'Brien
and Harvey B. Jacobson
Attorneys

Henry W. Lyons
INVENTOR.

May 13, 1969     H. W. LYONS     3,443,271
RECIPROCATING FLUID MOTOR Filed May 9, 1966     Sheet 5 of 5

Henry W. Lyons
INVENTOR.

United States Patent Office 3,443,271
Patented May 13, 1969

3,443,271
RECIPROCATING FLUID MOTOR
Henry W. Lyons, P.O. Box 3278,
San Angelo, Tex. 76901
Filed May 9, 1966, Ser. No. 548,538
Int. Cl. A47l 11/12; F01l 23/00
U.S. Cl. 15—22                                   23 Claims

ABSTRACT OF THE DISCLOSURE

A fluid motor housing encloses a pair of expansible chambers separated by a piston. As the piston approaches the end of its stroke in one direction, outflow from the contracting chamber is throttled by an exhaust valve which simultaneously vents inflow to the expanding chamber. A pressure responsive valve senses the throttled outflow condition to reroute inflow of fluid from one chamber to the other to reverse the direction of movement of the piston.

This invention relates to fluid operated devices and more particularly to a fluid motor of the reciprocating type capable of operating under varying loads and at varying speeds.

The present invention is concerned with the use of fluid under pressure such as water supplied at the usual pressures to the general public as a source of motive energy for power operated implements. Although fluid motors of this type have been marketed in connection with rotary cleaning implements for example, they have not proved to be satisfactory because of their very limited ability to operate under heavy load at relatively low speeds. The fluid motor of the present invention therefore represents a significant contribution in that it is capable of being operated with a substantially wide speed range for different operating requirements as well as to meet varying loads imposed thereon. The foregoing objectives are also achieved without any dimensional enlargement of the fluid motor and without any serious leakage problems.

In accordance with the foregoing, the fluid motor of the present invention features a pressure operated piston movably mounted within a housing enclosing a pair of expansible chambers alternatively pressurized to produce a power stroke in each direction of movement of the piston while the other chamber exhausts fluid from a previous stroke. In addition to the piston, there is an exhaust valve displaceable by the piston as it approaches the ends of its stroke for simultaneously throttling outflow of fluid from one side and restrictively venting inflow of fluid to the other side in order to decelerate the piston. The fluid motor also includes a pressure operated inlet valve displaceable relative to the piston as it approaches the ends of its stroke in order to reverse the direction of inflow from one side of the piston to the other.

As a result of the foregoing arrangement, the supply of an incompressible fluid such as water to the motor housing establishes a pressure differential between the inlet and outlet ports thereof which increases with any increase in the load tending to reduce the velocity of the piston and the driven element connected thereto. Accordingly, when the piston is decelerated as it approaches the ends of its stroke, the pressure differential increases to a maximum. The piston is thereby accelerated at a high rate in a reverse direction upon the completion of each stroke because of the maximum pressure differential developed. Also by regulating the inflow rate of fluid to the motor housing, the operational speed of the motor may be varied as desired.

A fluid motor of the aforementioned type will therefore be useful in many different installations and in particular as a power driver for cleaning implements. Water discharged from the fluid motor may also be routed through the bristles of the cleaning implement for example while inflow of water may be partially diverted for flow through a spray nozzle. If desired, the fluid motor may be associated with selectively controlled means so that it may operate in a wet condition discharging water through the cleaning implement or in a dry condition by conducting the outflow from the motor to a remote location.

In accordance with the foregoing attributes of the fluid motor, the present invention also features a selectively controlled valve assembly through which fluid flow to the motor is regulated for varying the speed thereof as well as to selectively divert water to a spray nozzle device. The selectively controlled valve assembly may therefore be mounted on the motor housing and be connected to an elongated handle conduit through which water under pressure is supplied thereto. A rotatably adjustable valve disk associated with the valve assembly may be held in sealing contact with its valve casing when water is supplied thereto under pressure. Such a valve assembly will be ideally suited as an economically manufactured component optionally associated with the fluid motor of the present invention or other fluid operated devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 5, 6:
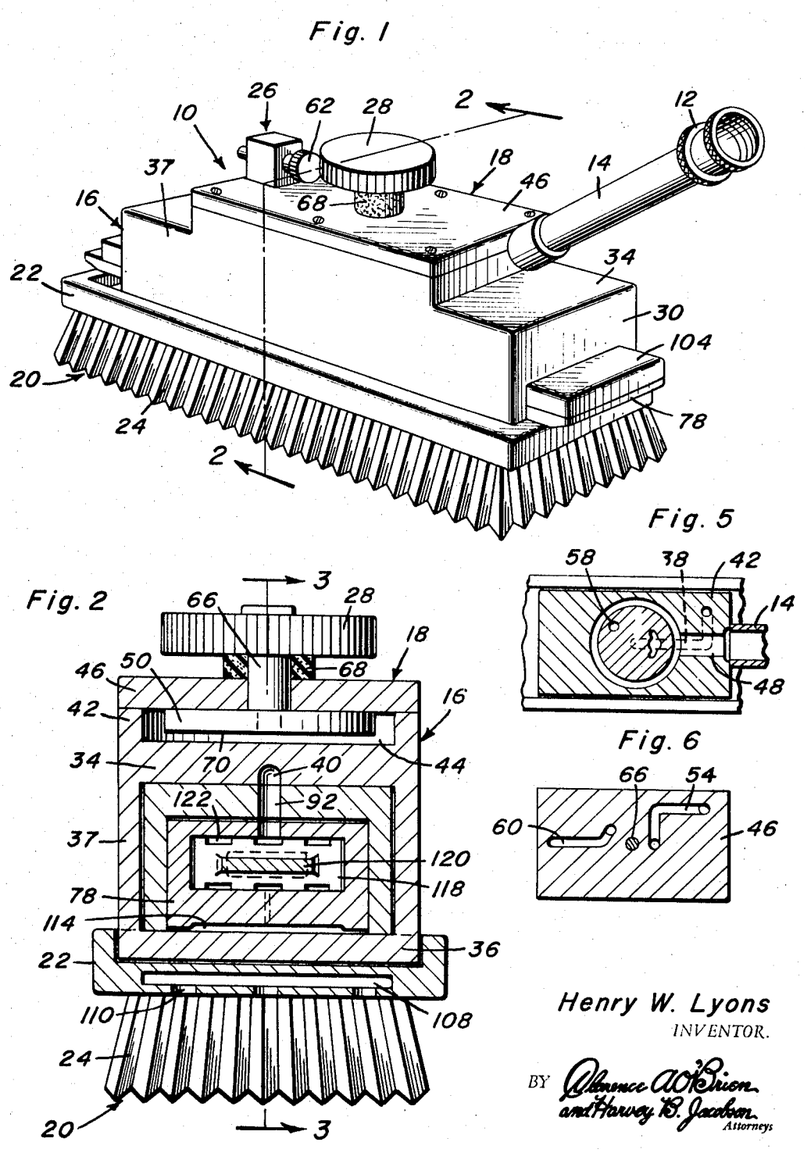
FIGURE 1 is a perspective view showing one form of fluid operated device constructed in accordance with the present invention.
FIGURE 2 is a transverse sectional view taken substantially through a plane indicated by section line 2—2 in FIGURE 1.
FIGURE 5 is a partial sectional view taken substantially through a plane indicated by section line 5—5 in FIGURE 3.
FIGURE 6 is a sectional view taken substantially through a plane indicated by section line 6—6 in FIGURE 3.

The fluid operated device generally denoted by reference numeral 10 in FIGURE 1 is associated with a source of fluid under pressure such as water supplied to the device through an elongated conduit (not shown) also constituting a handle adapted to be coupled by the fitting 12 to the inlet conduit section 14. The fluid operated device consists of a motor housing 16 on which a selectively controlled valve assembly 18 is mounted so that water under pressure may be supplied therethrough from the supply conduit section 14 to the motor within the motor housing in order to reciprocate a driven element 20. The driven element shown is in the form of a cleaning brush having a rectangular base 22 from which the bristles 24 extend. Also, mounted on the selectively controlled valve assembly 18, is a spray nozzle device 26 rendered operative to emit a regulated spray of water. The control knob 28 associated with the valve assembly 18 is therefore adapted to be angularly positioned in order to produce either reciprocation of the driven element at a regulated speed, simultaneous reciprocation of the driven element and discharge of a spray from the nozzle device 26 or a spray of water from the nozzle device without reciprocation of the driven element.

Figure 3:
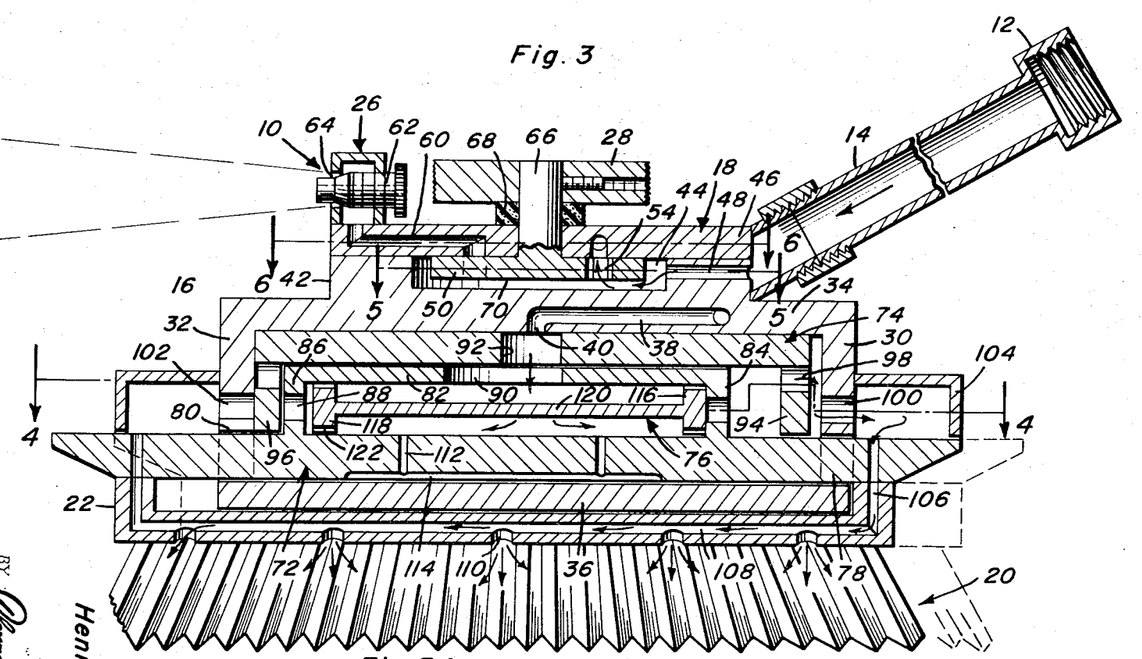
FIGURE 3 is a longitudinal sectional view taken substantially through a plane indicated by section line 3—3 in FIGURE 2.

As shown in FIGURES 2 and 3, the motor housing 16 is formed by a pair of end walls 30 and 32 interconnected between a top wall 34, a bottom wall 36 and a pair of side walls 37. Formed in the top wall is an inlet passage 38 the outlet end of which terminates at an inlet port 40. The inlet passage 38 extends into the valve casing 42 associated with the valve assembly 18. The valve casing 40 encloses a valve chamber 44 closed by a top wall 46 associated with the valve assembly.

The valve chamber 44 within the valve assembly is in fluid communication with the conduit section 14 through the passage 48 as shown in FIGURES 3 and 5. Water under pressure supplied to the chamber 44 will therefore axially urge the valve disk 50 into sealing engagement with the top wall 46 so as to avoid any fluid leakage between the valve disk and the passage 52 in the top wall establishing fluid communication between the valve disk and the inlet passage 38 associated with the fluid motor. The valve disk therefore mounts a valve passage 54 as more clearly seen in FIGURE 5 arranged to variably restrict flow of water as the valve disk is angularly rotated in either direction from the position shown in FIGURE 5. The valve disk also mounts another flow passage 58 establishing fluid communication between the chamber 44 and the flow passage 60 in the top wall 46 as shown in FIGURES 3 and 6 in order to supply water under pressure to the nozzle device 26. An externally threaded adjustment element 62 is therefore associated with the nozzle device so as to regulate the annular aperture 64 in the nozzle housing from which a regulated spray of water is emitted. It will be apparent therefore, that the valve disk 50 may be angularly rotated in order to regulate the flow rate of water to the inlet port 40 of the motor as well as to control the supply of water to the motor and to the spray nozzle device 26. An actuating shaft 66 is therefore connected to the valve disk and projects upwardly through the top wall 46 thereof to which the control knob 28 is connected. A spring element in the form of an annular sponge rubber member 68 is mounted about the actuating shaft 66 between the knob 28 and the top wall so as to continuously exert an axial bias on the valve disk to frictionally hold it in its position in contact with the top wall when there is no fluid pressure. It will be apparent therefore that the valve disk may be angularly adjusted by downwardly depressing the knob 28 against the bias of the annular sealing element 68 in order to permit angular adjustment thereof. Thus, upon release of the knob 28, the valve disk will again frictionally contact the top wall to hold it in its adjusted position. Supply of water under pressure to the chamber 44 will then exert a sealing pressure on the axial face 70 of the valve disk in order to prevent leakage from the passages 56 and 58 as aforementioned.

The fluid motor contains basically three movable elements within the housing 16 consisting of a piston member 72, an exhaust valve member 74 and an inlet valve member 76. The piston member includes an elongated portion 78 having opposite ends projecting from the motor housing to which the base 22 of the driven element is connected. The elongated portion 78 of the piston extends through openings 80 formed in the end walls 30 and 32 of the motor housing so as to slidably mount the piston for reciprocation between limit positions established thereby. Also associated with the piston member is a valve body portion 82 having opposite pressure surface walls 84 and 86 between which the inlet valve member 76 is movably mounted. The pressure surface walls 84 and 86 of the piston member therefore mount flow passages 88 adapted to be alternatively closed by the inlet valve member. Also mounted by the valve body portion 82 centrally between the pressure surface walls 84 and 86, in an inlet opening 90 in constant fluid communication with the inlet 40 through an opening 92 formed in the exhaust valve member 74.

The exhaust valve member encloses the valve body portion 82 associated with the piston member and includes valve closing end portions 94 and 96 disposed between the end walls 30 and 32 of the motor housing and the pressure surface walls 84 and 86 of the piston member. A pair of passages 98 are formed in each end wall 94 and 96 so that fluid may flow therethrough to the exhaust ports 100 and 102 formed in the end walls 30 and 32. Shields 104 are connected to and project from the end walls of the motor housing so that outflow of water from the motor housing will be confined to flow through passages 106 formed in the end portions of the piston member and the water distributing passage 108 in the base 22 of the driven element. The base 22 is therefore provided with a plurality of discharge ports 110 communicating with the distributing passage 108 so that the water may be discharged between the bristles 24 of the cleaning implement. Water under pressure entering the valve body portion 82 of the piston member through the openings 90 and 92, is also conducted through the connecting passages 112 to a lubricating passage 114 formed in the elongated portion 78 of the piston member in order to establish a water lubricated slide bearing support for the piston member within the motor housing.

The inlet valve member 76 includes a pair of end portions 116 and 118 interconnected by a web portion 120. The end portions 116 and 118 are adapted to respectively close the valve openings 88 in the pressure surface walls 84 and 86 associated with the piston member in order to block flow in one direction or the other through the piston member. End portions 116 and 118 also are formed with flow passages 122 through which water may flow from the valve body portion 82 through the passage opening 88 uncovered by the inlet valve member.

Figure 3A:
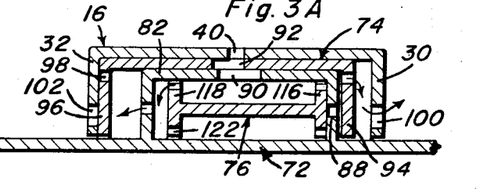
FIGURES 3A and 3B are simplified diagrammatic views corresponding to the side sectional view of FIGURE 3 but showing the fluid motor in different operational phases.
Figure 3B:
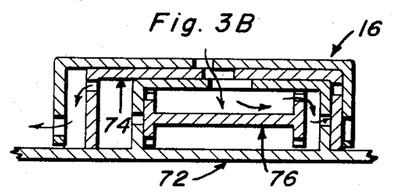
Figure 4:
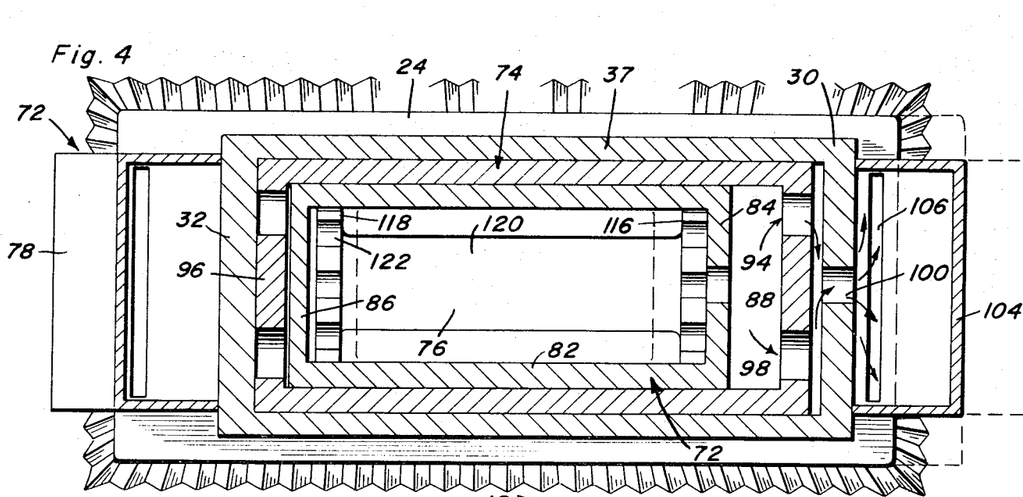
FIGURE 4 is a top sectional view taken substantially through a plane indicated by section line 4—4 in FIGURE 3.

Referring now to FIGURES 3, 3A and 3B opration of the fluid motor will become apparent. One operational cycle of the fluid motor is begun with the movable parts thereof at the left hand end of the stroke for example, as shown in FIGURE 3. Thus, the end wall 96 of the exhaust valve member 74 abuts the end wall 32 of the motor housing to close the exhaust port 102. In this position, the exhaust valve member establishes one of the limit positions for the piston member 72 and permits pressurization of an expansible chamber on the left side thereof as viewed in FIGURE 3. Before the beginning of the operational cycle, the inlet valve member is displaced in a right hand direction relative to the piston member so that its end portion 116 closes the valve passage 88 formed in the pressure surface wall 84 and uncovers the valve passage 88 in the pressure surface wall 86, as shown in FIGURE 3. The space between the end wall 30 of the motor housing and the pressure surface wall 84 of the piston member therefore forms a chamber filled with fluid from a previous operational cycle which is vented to atmosphere through the uncovered exhaust port 100. Since the valve passage 88 in the pressure wall 84 of the piston member is closed, inflow of fluid through the passage 88 uncovered by the inlet valve imparts movement to the piston member in a right hand direction displacing fluid in the chamber on the right thereof through the passages 106 and 108 for discharge from the outlet openings 110. At the same time, a chamber on the left side of the piston pressure wall 86 is expanded by said inflow of fluid under pressure through the flow path established by the inlet valve 76. As will be explained hereafter, the inlet pressure of the fluid entering the expanding chamber at the beginning of the cycle is of maximum value so as to effectively accelerate the piston member from standstill to begin the operational cycle. As the velocity of the piston member increases, the inlet pressure or pressure differential between the fluid pressure at the inlet port 40 and at the exhaust port 100 decreases. It will also be appreciated that any further reduction in the velocity of the piston member because of a change in the load imposed thereon will produce a coresponding increase in the pressure differential since the discharge flow rate of fluid from the motor depends upon the velocity of the piston member displacing fluid from the contracting chamber vented by the exhaust port 100 as the piston member advances from its left hand limit position toward the opposite end of its stroke.

Before the piston member reaches the right hand end of its stroke, it effectively engages the end portion 94 of the exhaust valve member 74 as shown in FIGURE 3A to begin throttling the outflow of fluid from the contracting chamber on the right side of the piston member. At the same time, movement imparted to the exhaust valve member 74 by the piston member begins to uncover the exhaust port 102 on the left hand end wall 32 of the motor housing. Accordingly, the throttling of outflow through the exhoust port 100 and restrictive venting of the inflow to the expanding chamber decelerates the piston member as it approaches its right hand limit position. This deceleration of the piston member is occasioned by an increase in the pressure differential which therefore reaches a maximum value at the end of the piston stroke. It will also be appreciated, that as the outflow through exhaust port 100 is being throttled, the pressure on the right side of the piston increases simultaneously with the decrease in pressure on the left hand side. When the pressure on the right hand side reaches a predetemined value and exceeds the pressure on the left hand side during approach of the piston to its limit position, this change in pressures is sensed by the pressure responsive end faces of the inlet valve causing it to shift from the position shown in FIGURE 3A to the position shown in FIGURE 3B. Shifting of the inlet valve closes the flow path from the inlet port 40 to the chamber on the left side of the piston and establishes a flow path to the chamber on the right side of the piston. The fluid motor as shown in FIGURE 3B will then be in condition for reversing the movement of the piston member at the right hand end of the stroke. The operational sequence is then repeated in the reverse direction so as to complete an operational cycle when the piston returns to its left hand limit position shown in FIGURE 3.

It will be appreciated from the foregoing description, that the pressure changes associated with the fluid motor produces pulsating pressure action the frequency of which is varied by either regulating the inflow rate of fluid or by varying the load imposed on the piston member. The load handling capability of the fluid motor has been found to be unexpectedly high despite the use of the generally available water under pressure from city water supply mains as the source of motive energy. Also, the parts of the fluid motor may be economically constructed from materials such as plastic having the requisite pressure sealing, sliding friction and impact resistant properties. It will also be appreciated that the basic parts of the fluid motor may be varied in actual shape or configuration as long as the basic functions remain the same. Further, the fluid motor may be arranged to produce cyclic movement of any type in addition to the straight linear movement as illustrated in FIGURES 1 through 6.

Figures 7, 8:
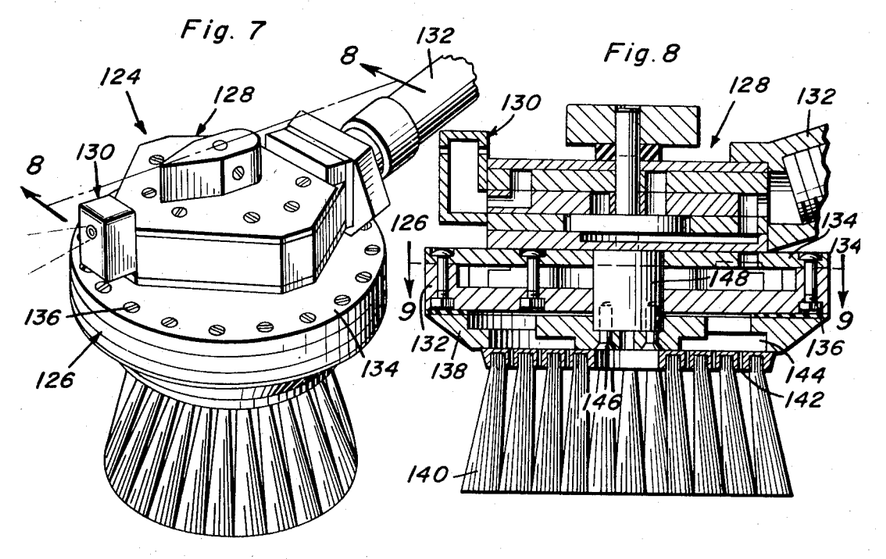
FIGURE 7 is a perspective view of another form of fluid operated device constructed in accordance with the present invention.
FIGURE 8 is a sectional view taken substantially through a plane indicated by section line 8—8 of FIGURE 7.

An oscillatory type of fluid motor is disclosed in connection with another form of fluid operated device 124 as shown in FIGURE 7. The power operated device 124 includes therefore, a cylindrical motor housing 126 on which a selectively controlled valve assembly 128 and spray nozzle device 130 are mounted. The valve assembly 128 and spray nozzle 130 are similar in construction and operation to the valve assembly 18 and spray nozzle device 26 described in connection with FIGURES 1 through 6. Fluid under pressure is therefore supplied to the control valve assembly 128 by means of the inlet conduit 132 so that a regulated flow of water under pressure may be conducted to the cylindrical motor housing. A shown in FIGURES 8 and 9, the motor housing includes a housing body 132 enclosing a cylindrical chamber closed by the top wall 134 secured to the housing body by a plurality of fasteners 136, the top wall mounting thereon the selectively controlled valve assembly 128. Rotatably mounted below the housing body 132, is a driven element 138 having a plurality of bristles 140 between which water discharge apertures 142 are located. The discharge apertures 142 are located. The discharge apertures 142 are in fluid communication with exhaust flow passages 144 within the driven member 138. The driven element 138 is also connected by fasteners 146 to an axially projecting shaft section 148 associated with an oscillatory piston member 150 mounted within the cylindrical chamber of the motor housing 126 as more clearly seen in FIGURE 9.

Figure 9:
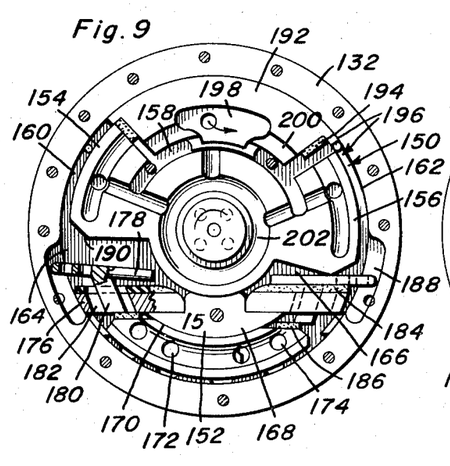
FIGURE 9 is a top sectional view taken substantially through a plane indicated by section line 9—9 in FIGURE 8.

The oscillatory piston member 150 includes a central hub portion 152 to which the shaft 148 is connected and a pair of radially projecting pressure surface portions 154 and 156. A valve chamber 158 is formed between the radial portions of the piston member which communicates through the radially outer passages 160 and 162 with expansible pressure chambers 164 and 166 at opposite angular sides of the piston member. The chambers 164 and 166 are separated from each other by means of a mounting block 168 fixedly mounted within the cylindrical chamber in slide bearing engagement with the hub portion 152 of the piston member. The mounting block 168 also provides a radially outer slide bearing surface 170 for an angularly shiftable synchronizing element 172 having passage openings 174 communicating with the outflow passages 144 in the driven member 138. Fixedly mounted on the mounting block 168 and extending diametrically across the cylindrical chamber enclosed by the motor housing, are a pair of exhaust valve seats 176 having associated therewith a pair of movable exhaust valve elements 178. Each valve element includes a stem 180 which extends through an exhaust port 182 formed in each valve seat element through which outflow of water occurs. The exhaust valve elements are adapted to alternatively close the exhaust ports 182. The stems 180 project from the exhaust ports and engage the axial ends of the synchronizing element 172 so as to prevent simultaneous closing of both exhaust ports. Shock absorbing liners 184 and 186 may be mounted on the valve seat elements 176 and the ends of the synchronizing element 172 so as to absorb impact between the contacting surfaces. Also, apertures are formed in the exhaust valve elements 178 which project outwardly into cavities 188 within the housing body 132 in order to insure that fluid under pressure is exerted uniformly on all surfaces so that the exhaust valve element may be displaced exclusively in response to engagement with the contact edges 190 of the piston member 150.

Slidably mounted within the valve chamber 158 for angular displacement about the rotational axis of the piston member, is an inlet valve member 192 having shock absorbing contact elements 94 engageable with the radial portions 154 and 156 of the piston member so as to limit displacement of the inlet valve member relative to the piston member. The inlet valve member also is provided with projecting, passage closing portions 196 operative to alternative close one of the passages 160 and 162 blocking inflow of fluid to one of the expansible chambers 164 and 166. The inlet valve member is therefore provided with an inlet cavity 198 in communication with the valve chamber 158 through the connecting passages 200 on either side of the inlet cavity. The valve chamber is also in fluid communication with a system of lubricating grooves 202 formed in the piston member for slide bearing purposes.

Figure 10:
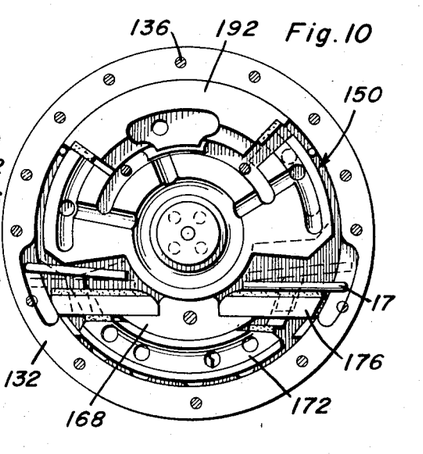
FIGURE 10 is a sectional view similar to FIGURE 9 but showing the fluid motor in another operational phase.

The fluid motor associated with the fluid operated device 128 is similar in operation to the rectilinear reciprocating motor associated with the power operated device 10. As shown in FIGURE 9, the piston member 150 is at the right hand end of its stroke. The exhaust valve element 178 engageable by the radial portion 156 of the piston member therefore closes the exhaust port 182 associated with the expansible chamber 166 so that fluid inflow may be conducted thereto for expanding this chamber while the other chamber 164 is vented through its exhaust port 182. The piston member is therefore angularly displaced from the position shown in FIGURE 9 when water under pressure is supplied to the motor housing. When the piston approaches the end of its stroke in the counterclockwise direction shown in FIGURE 10, the contact edge 190 of the radial portion 154 engages the exhaust valve element 178 associated with the chamber 164 to begin throttling outflow of fluid through the exhaust port 182 and venting inflow to chamber 166. When the chamber 164 is pressurized and the chamber 166 vented, the inlet valve 192 is then shifted relative to the piston member from the position shown in FIGURE 10 to its other position in order to block further inflow to the chamber 164 and establish a flow path of fluid to the chamber 166, this occurring at the end of the counterclockwise stroke of the piston member as shown by dotted lines in FIGURE 10. The piston member then undergoes angular displacement in a clockwise direction returning to the position illustrated in FIGURE 9 completing one cycle of operation. It will be apparent therefore, that except for the angular movement imparted to the piston member, rather than straight rectilinear movement, operation of the fluid motor associated with the fluid operated device 124 is similar to that described in connection with the fluid operated device 10.

Figure 11:
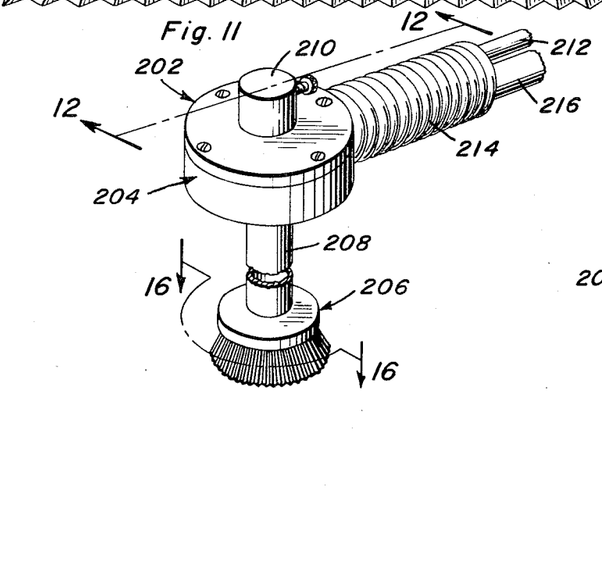
FIGURE 11 is a perspective view of a third form of fluid operated device.

A third form of fluid operated device is shown in FIGURE 11 and is generally referred to by reference numeral 202. The fluid operated device 202 like the device 124 of FIGURES 7 through 10, employs an oscillating type of fluid motor enclosed by a cylindrical motor housing 204. The motor thus operates an oscillatory brush-type cleaning implement 206 through a tubular shaft 208. Water may be conducted through the tubular shaft 208 to the cleaning device for operation thereof in a wet condition. Alternatively, the cleaning implement 206 may be oscillated in a dry condition. The condition under which the cleaning implement 206 is operated is selectively controlled through a control device 210 mounted on the motor housing 204.

Water under pressure is supplied to the motor housing by a supply conduit 212 extending through a grip handle 214 to which a return flow conduit 216 is also connected.

Figure 12:
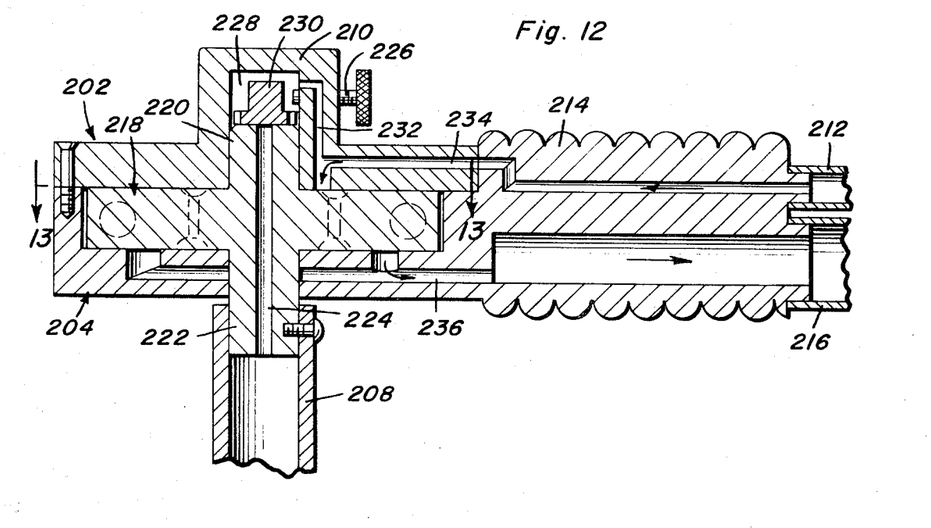
FIGURE 12 is an enlarged sectional view taken substantially through a plane indicated by section line 12—12 in FIGURE 11.
Figures 13, 14, 15:
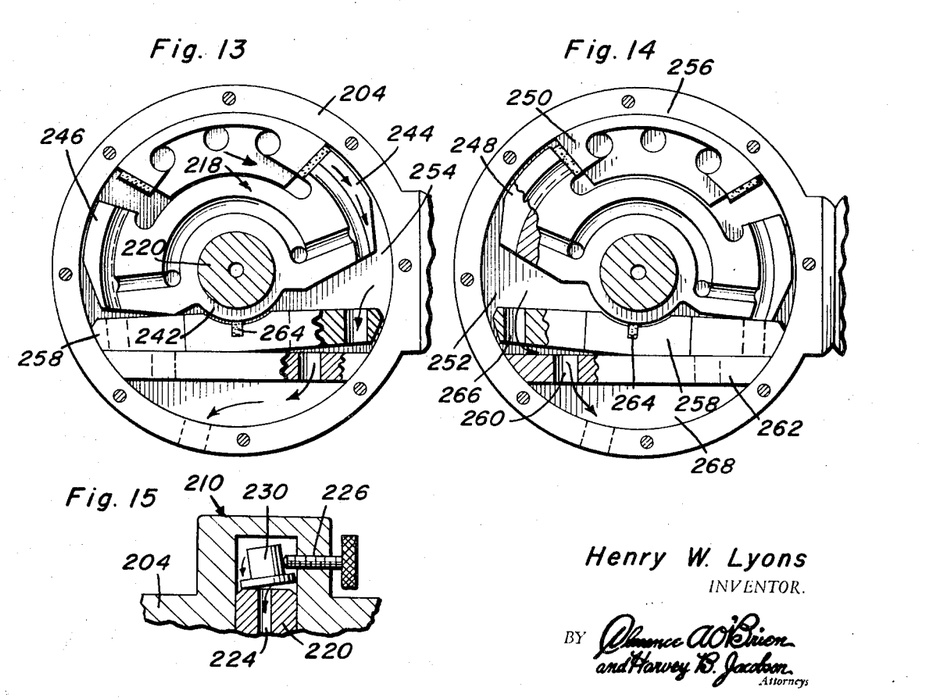
FIGURE 13 is a transverse sectional view taken substantially through a plane indicated by section line 13—13 in FIGURE 12.
FIGURE 14 is a sectional view similar to FIGURE 13 but showing the fluid motor in another operational phase.
FIGURE 15 is a partial sectional view showing a portion of the device illustrated in FIGURE 12 in another operational condition.
Figure 16:
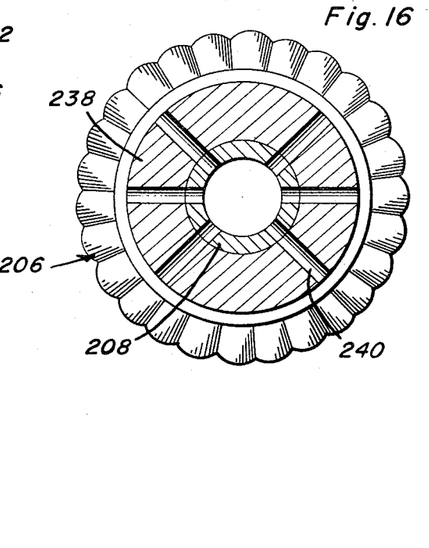
FIGURE 16 is a sectional view taken substantially through a plane indicated by section line 16—16 in FIGURE 11.

As shown in FIGURE 12, the cylindrical chamber formed within the motor housing 204 mounts an oscillatable piston member 218 having opposite axial shaft extensions 220 and 222 through which a central flow passage 224 extends. The shaft extension 220 is received within the axial housing extension associated with the selective control 210 which threadedly mounts an axially adjustable screw element 226. Loosely mounted within the cavity 228 formed in the control housing extension, is a pressure responsive element 230 having a lower flange adapted to rest on top of the shaft extension 220 so as to close the upper end of the passage 224 as shown in FIGURE 12. The cavity 228 may be pressurized with water under pressure through the passage 232 connected to the inlet passage 234 formed in the handle 214 for conducting water under pressure from the supply conduit 212 to the cylindrical chamber of the motor housing. It will therefore be apparent, that the water pressure itself will cause the element 230 to close the passage 224 in order to prevent any water from reaching the driven brush device 206, outflow of water from the cylindrical chamber of the motor housing being conducted by the passage 236 to the return conduit 216. Should it be desired to operate the cleaning implement 206 in a wet condition, the screw element 226 is axially adjusted so as to abut the pressure responsive element 230 as shown in FIGURE 15 opening the passage 224 so that water under pressure may be simultaneously supplied through the shaft 208 to the cleaning implement as it is being oscillated. The bristle holder 238 associated with the cleaning implement is therefore provided with a plurality of radial passages 240 communicating with the axial passage in the hollow shaft 208 through which some of the inflow water is diverted.

The fluid motor associated with the fluid operated device 202 is similar to the fluid motor associated with the fluid operated device 124 described in connection with FIGURES 7 through 10. As shown in FIGURE 13, the fluid motor includes the oscillating piston member 218 having a hub portion 242 and a pair of radial end portions 244 and 246 similar to the piston member 150 associated with fluid operated device 124. Circumferentially outer passages 248 are formed in the piston member so as to conduct flow of water from the inlet valve chamber 250 to one of the expansible chambers 252 and 254 on either side of the piston member. An inlet valve member 256 is mounted within the valve chamber for shifting movement between two positions alternatively closing one of the passages 248 through which a flow path is established to the volumetrically expanding chamber 252 or 254.

Also associated with the fluid motor is an oscillatable type of exhaust valve member 258 displaceable between opposite positions, respectively shown in FIGURES 13 and 14 by the piston member so as to alternatively close one of the two exhaust ports 260 formed in the valve seat member 262 which is fixedly mounted within the cylindrical chamber of the fluid motor and extends diametrically thereacross in spaced relation to the hub portion 242 of the piston member. The chambers 252 and 254 are separated from each other by means of a wiping seal 264 carried by the exhaust valve member. It will therefore be apparent that fluid in one of the chambers 252 and 254 will be displaced through one of the passages 266 in the exhaust valve member 258 and one of the exhaust ports 260 into the exhaust chamber 268 communicating with the outlet passage 236 within the motor housing.

Operation of the fluid motor of device 202 as shown in its opposite limit positions in FIGURES 13 and 14, is the same as described in connection with the fluid motor of the fluid operated device 124 in FIGURES 7 through 10. Inasmuch as a single valve element 258 is utilized however, no separate synchronizing element is needed. Although this arrangement of the fluid operated device 202 is simpler and less expensive, it has the disadvantage of relying on a wiping type of seal to operationally separate the chambers on either side of the piston member.

From the foregoing description, the construction and operation of the fluid motors in accordance with the present invention will be apparent. In each case, inflow and outflow of fluid to and from the motor is substantially equal until such time as the unique exhaust valve and inlet valve actions occur as the piston approaches the stroke limit positions. The operational attributes of the fluid motor render it suitable for heavy cleaning action without requiring any large and expensive construction and without requiring any high pressure source of fluid. Further, the fluid motor may be associated with a selectively controlled valve assembly through which the inflow rate of fluid may be regulated in order to vary the speed of the motor and control operation of auxiliary fluid operated devices such as the spray nozzles described. Facilities may also be provided to operate the driven implement in either a wet or dry condition. It should of course be appreciated that the invention is not necessarily limited to any particular driven element or source of fluid and could be utilized as a pump when motive energy is externally applied to the piston or two units utilized in a motor pump combination.

What is claimed as new is as follows:

1. In combination with a source of fluid under pressure, a driven element and a fluid operated motor connected to the source for reciprocating the driven element between limit positions comprising, a housing having an inlet port operatively connected to said source and at least two exhaust ports, piston means connected to said driven element forming expansible chambers within the housing, exhaust valve means displaceable by the piston means in response to approach thereof to each of the limit positions for closing one of said exhaust ports and opening the other of said exhaust ports to simultaneously pressurize one of the chambers and vent the other of the chambers, inlet valve means mounted within said piston means and displaceable relative thereto in response to pressurization of one of said chambers for blocking flow of fluid from the inlet port to the vented chamber and establishing a flow passage from the inlet port to the pressurized chamber.

2. The combination of claim 1 wherein said piston means comprises an elongated member slidably mounted by the housing, a valve body mounted by the elongated member having pressure surfaces spaced from the exhaust ports by said exhaust valve means, said pressure surfaces having fluid passages therein establishing fluid communication between the inlet valve means and the expansible chambers, said inlet valve means being mounted within said valve body for movement between said pressure surfaces to alternatively close the fluid passages therein.

3. In combination with a source of fluid under pressure, a driven element and a fluid operated motor connected to the source for reciprocating the driven element between limit positions comprising, a housing having an inlet port operatively connected to said source and at least two exhaust ports, piston means connected to said driven element forming expansible chambers within the housing, exhaust valve means displaceable by the piston means in response to approach thereof to each of the limit positions for closing one of said exhaust ports and opening the other of said exhaust ports to simultaneously pressurize one of the chambers and vent the other of the chambers, inlet valve means displaceable relative to the piston means in response to pressurization of one of said chambers for blocking flow of fluid from the inlet port to the vented chamber and establishing a flow passage from the inlet port to the pressurized chamber, said piston means comprising a pressure responsive member angularly displaceable about a fixed axis, a valve chamber formed by said member within said housing enclosing in inlet valve means, said member having fluid passages there establishing fluid communication between the valve chamber and the expansible chambers.

4. The combination of claim 3 wherein said exhaust valve means comprises a valve element angularly displaceable about said fixed axis by the member, and seal means mounted by the valve element in engagement with the member for preventing fluid communication between the expansible chambers.

5. The combination of claim 3 wherein said exhaust valve means comprises a pair of valve elements displaceable between positions opening and closing said exhaust ports, means fixedly mounted within said housing for movably mounting the valve elements and separating the expansible chambers from each other, and valve synchronizing means movably mounted within said housing for preventing simultaneous closing of the exhaust ports.

6. In combination with a source of fluid under pressure, a driven element and a fluid operated motor connected to the source for reciprocating the driven element comprising, a piston member connected to said driven element for movement thereof between limit positions, housing means enclosing expansible chambers separated by said piston member, exhaust valve means displaceable by the piston member in response to approach thereof to said limit positions for alternatively venting said expansible chambers, and inlet valve means carried by said piston member for establishing a flow passage from the source to one of the expansible chambers in response to venting of the other of the expansible chambers when the piston member reaches one of the limit positions.

7. The combination of claim 6 wherein said piston member includes an exhaust passage in constant fluid communication with said exhaust valve means for conducting fluid from the housing to the driven element.

8. The combination of claim 6 wherein said housing includes exhaust ports and an exhaust passage in constant fluid communication with said exhaust ports for conducting fluid from the exhaust valve means.

9. The combination of claim 8 including an auxiliary passage extending through the piston member for conducting fluid from the source to the driven element, and means for selectively blocking fluid flow through said auxiliary passage during flow of fluid to the housing.

10. The combination of claim 6 including a selectively controlled valve assembly mounted on the housing for regulating the flow rate of fluid from the source to the housing to control the speed of the fluid operated motor.

11. The combination of claim 10 wherein said valve assembly comprises a valve casing having a pressure chamber, a valve disk rotatably mounted in said pressure chamber, inlet and outlet passages formed in said valve casing between the pressure chamber and the source and between the valve disk and the inlet port in the housing, said valve disk having a variable flow passage therein establishing fluid communication between the pressure chamber and the outlet passage and an axial pressure face, a valve actuating shaft connected to the valve disk and projecting from the valve casing, and sealing means mounted on the shaft biasing the valve disk in a direction holding the pressure face in contact with the valve casing.

12. The combination of claim 11 including spray nozzle means mounted on the valve assembly for spraying the fluid from the source separately or simultaneously with movement of the driven element.

13. The combination of claim 6 including spray nozzle means mounted on the housing for spraying fluid from the source separately or simultaneously with movement of the driven element, and a selectively controlled valve assembly mounted on the housing for regulating the flow rate of fluid from the source to the housing and supply of fluid to the spray nozzle means.

14. The combination of claim 13 wherein said driven element is a cleaning implement.

15. In combination with a source of fluid under pressure and a fluid operated device having an inlet port, a selectively controlled valve assembly for establishing fluid communication between said source and the inlet port, comprising a valve casing having a pressure chamber in fluid communication with said source, a valve disk rotatably mounted in said pressure chamber having a pressure face, an outlet passage formed in said valve casing, said valve disk having a variable flow passage establishing fluid communication between the pressure chamber and the outlet passage, a valve actuating shaft connected to the valve disk and projecting from the valve casing, and means mounted on the shaft biasing the valve disk in a direction holding the pressure face in contact with the valve casing, said fluid operated device comprising a driven element reciprocated between limit positions, a housing having an inlet port operatively connected to said source and at least two exhaust ports, piston means connected to said driven element forming expansible chambers within the housing, exhaust valve means displaceable by the piston means in response to approach thereof to each of the limit positions for closing one of said exhaust ports and opening the other of said exhaust ports to simultaneously pressurize one of the chambers and vent the other of the chambers, inlet valve means mounted within said piston means and displaceable relative thereto in response to pressurization of one of said chambers for blocking flow of fluid from the inlet port to the vented chamber and establishing a flow passage from the inlet port to the pressurized chamber.

16. The combination of claim 15 wherein said piston means comprises an elongated member slidably mounted by the housing, a valve body mounted in the elongated member having pressure surfaces spaced from the exhaust ports by said exhaust valve means, said pressure surfaces having fluid passages therein establishing fluid communication between the inlet valve means and the expansible chambers, said inlet valve means being mounted within said valve body for movement between said pressure surfaces to alternatively close the fluid passages therein.

17. In combination with a source of fluid under pressure, a driven element and a fluid operated motor connected to the source for reciprocating the driven element comprising, a piston member connected to said driven element for movement thereof between limit positions, housing means enclosing expansible chambers separated by said piston member, selectively controlled valve means mounted on the housing means for regulating the rate of expansion of said expansible chambers to vary the displacement rate of the piston member, exhaust valve means displaceable by the piston member in response to approach thereof to said limit positions for alternatively venting said expansible chambers, and inlet valve means carried by said piston member for establishing a flow passage from the source to one of the expansible chambers in response to venting of the other of the expansible chambers when the piston member reaches one of the limit positions.

18. The combination of claim 17 including an elongated handle connected to said selectively controlled valve means having a supply conduit therein connecting said source of fluid to the inlet port of the housing means and conduit means mounted by the driven element through which fluid from the exhaust ports is discharged.

19. In combination with a source of fluid under pressure, a driven element and a fluid operated motor connected to the source for reciprocating the driven element comprising, a piston member connected to said driven element for movement thereof between limit positions, housing means enclosing expansible chambers separated by said piston member, exhaust valve means displaceable by the piston member in response to approach thereof to said limit positions for alternatively venting said expansible chambers, and inlet valve means for establishing a flow passage from the source to one of the expansible chambers in response to venting of the other of the expansible chambers when the piston member reaches one of the limit positions, and an elongated handle having a supply conduit therein connecting said source of fluid to the inlet valve means and a return conduit for discharging fluid from the exhaust valve means at a location remote therefrom.

20. In a fluid motor, a housing having inlet means and outlet means establishing substantially equal inflow and outflow rates, a piston mounted within said housing for movement through a predetermined stroke, fluid pressure supply means connected to said housing for establishing a pressure differential between the inlet and outlet means varying in accordance with the load on the piston, means responsive to approach of said piston to the end of the stroke for simultaneously throttling outflow to the outlet means and venting inflow from the inlet means to decelerate the piston and increase said pressure differential, and inlet valve means responsive to a predetermined decrease in said outflow for restoring said substantially equal inflow and outflow rates through the inlet and outlet means respectively, whereby the piston is accelerated in a reverse direction at the end of the stroke when the pressure differential is maximum.

21. A fluid power device comprising a housing having inlet and outlet ports and enclosing at least two expansible chambers, piston means movably mounted within said housing for simultaneously expanding one of the chambers and contracting the other of the chambers, an exhaust valve assembly displaceable relative to the housing for discharging fluid through said outlet port from the chamber being contracted and including means engageable by the piston means for displacement of the valve assembly to limit expansion and contraction of said chambers, and flow controlling valve means movable with the piston means for changing the flow path between said inlet and outlet ports in response to movement thereof relative to the piston means.

22. In combination with a source of fluid under pressure and a fluid operated device, a selectively controlled valve assembly comprising a rotatable valve member, a valve casing having a pressure chamber in fluid communication with said source, means mounting the valve member within the chamber for angular and axial displacement, outlet passage means extending through the valve casing, said valve member having a contact surface engageable with the valve casing, pressure responsive means continuously exposed to pressurized fluid in said chamber for holding the contact surface in engagement with the valve casing sealing said outlet passage means from the chamber and a valve passage establishing controlled fluid communication between the chamber and the outlet passage means when aligned therewith, means yieldably holding the valve member in engagement with the valve casing independently of the pressure responsive means and actuator means connected to the valve member for axial and angular displacement thereof to respectively disengage the contact surface from the valve casing and reposition the valve passage relative to the outlet passage means.

23. In combination with a source of fluid, a fluid power device comprising a housing enclosing a pair of variable volume chambers, a piston separating said chambers, exhaust valve means engageable by the piston while approaching limit positions for throttling outflow of fluid from one of the chambers and venting inflow of fluid from the source to the other of the chambers and pressure operated valve means responsive to said throttling of the outflow for changing the flow of fluid from said source to the other of the chambers.

(References on following page)

References Cited

UNITED STATES PATENTS

| | | | |
|---|---|---|---|
| 1,056,736 | 3/1913 | Carey | 91—341 |
| 1,179,834 | 4/1916 | Hudler | 251—180 |
| 3,155,011 | 11/1964 | Hyskell | 91—341 |
| 3,162,736 | 12/1964 | Turner | 251—208 |
| 3,214,823 | 11/1965 | Hendrickson | 91—341 X |

EDWARD L. ROBERTS, *Primary Examiner.*

U.S. Cl. X.R.

51—175; 91—341